(12) United States Patent
Nishida et al.

(10) Patent No.: US 11,319,967 B2
(45) Date of Patent: May 3, 2022

(54) CENTRIFUGAL MULTISTAGE COMPRESSOR

(71) Applicant: Hitachi Industrial Products, Ltd., Tokyo (JP)

(72) Inventors: Kohei Nishida, Tokyo (JP); Tomohiro Naruse, Tokyo (JP); Kiyotaka Hiradate, Tokyo (JP)

(73) Assignee: Hitachi Industrial Products, Ltd., Tokyo (JP)

( * ) Notice: Subject to any disclaimer, the term of this patent is extended or adjusted under 35 U.S.C. 154(b) by 0 days.

(21) Appl. No.: 17/263,479

(22) PCT Filed: Jun. 4, 2019

(86) PCT No.: PCT/JP2019/022092
§ 371 (c)(1),
(2) Date: Jan. 26, 2021

(87) PCT Pub. No.: WO2020/031480
PCT Pub. Date: Feb. 13, 2020

(65) Prior Publication Data
US 2021/0164485 A1    Jun. 3, 2021

(30) Foreign Application Priority Data
Aug. 6, 2018    (JP) .............................. JP2018-147728

(51) Int. Cl.
*F04D 17/12*    (2006.01)
*F04D 29/16*    (2006.01)
(Continued)

(52) U.S. Cl.
CPC ........... *F04D 29/162* (2013.01); *F04D 17/12* (2013.01); *F04D 17/122* (2013.01);
(Continued)

(58) Field of Classification Search
CPC .... F04D 17/122; F04D 29/083; F04D 29/012; F04D 29/122; F04D 29/286; F04D 29/4206; F05D 2240/55
See application file for complete search history.

(56) References Cited

U.S. PATENT DOCUMENTS 4,493,611 A * 1/1985 Funakoshi .............. F01D 25/24
                                                     415/199.1
10,082,151 B2 * 9/2018 Gilarranz ............... F16J 15/406
(Continued)

FOREIGN PATENT DOCUMENTS

JP      63-92098 U      6/1988
JP      2003-201993 A   7/2003
(Continued)

OTHER PUBLICATIONS

International Search Report (PCT/ISA/210) issued in PCT Application No. PCT/EP2019/022092 dated Aug. 27, 2019 with English translation (four (4) pages).
(Continued)

*Primary Examiner* — Ninh H. Nguyen
(74) *Attorney, Agent, or Firm* — Crowell & Moring LLP

(57) ABSTRACT

The present invention provides a centrifugal multistage compressor adapted to inhibit corrosion of an intermediate stage labyrinth. More particularly, the present invention provides a centrifugal multistage compressor adapted to inhibit carbon dioxide corrosion of the intermediate stage labyrinth. The centrifugal multistage compressor of the present invention includes: a rotary shaft equipped with a plurality of impellers; an ejection flow path extended between a first stage of the impellers and a last stage of the impellers and serving to discharge a fluid once from the compressor; a suction flow path extended between the first stage of the impellers and the last stage of the impellers and serving to inject the discharged fluid once again into the
(Continued)

compressor; an intermediate diaphragm disposed between the ejection flow path and the suction flow path; and an intermediate stage labyrinth for sealing between the ejection flow path and the suction flow path, and has a configuration where the intermediate diaphragm includes a bypass flow path for supplying the intermediate stage labyrinth with some of the fluid flowing to the ejection flow path.

5 Claims, 2 Drawing Sheets

(51) Int. Cl.
    *F04D 29/043*      (2006.01)
    *F04D 29/28*      (2006.01)
    *F04D 29/12*      (2006.01)

(52) U.S. Cl.
    CPC ......... *F04D 29/043* (2013.01); *F04D 29/122* (2013.01); *F04D 29/286* (2013.01); *F05D 2240/55* (2013.01)

(56) References Cited

U.S. PATENT DOCUMENTS

| | | | |
|---|---|---|---|
| 10,473,109 B2 * | 11/2019 | Gallinelli | ............ F04D 27/001 |
| 2016/0312786 A1 | 10/2016 | Sarri | |
| 2017/0226896 A1 * | 8/2017 | Yagi | ................... F04D 29/4206 |

FOREIGN PATENT DOCUMENTS

| | | |
|---|---|---|
| JP | 2010-159634 | 7/2010 |
| JP | 2014-62504 A | 4/2014 |
| JP | 2016-540928 A | 12/2016 |

OTHER PUBLICATIONS

Japanese-language Written Opinion (PCT/ISA/237) issued in PCT Application No. PCT/EP2019/022092 dated Aug. 27, 2019 (four (4) pages).

* cited by examiner

CENTRIFUGAL MULTISTAGE COMPRESSOR

TECHNICAL FIELD

The present invention relates to a centrifugal multistage compressor.

BACKGROUND ART

Japanese Patent Application Laid-Open No. 2010-159634 (PTL 1) is cited as the background art of the field of the present invention. This patent literature discloses a turbomachine which uses, as a working fluid, a medium condensed and liquified at ordinary temperatures and pressures and which includes a rotating body and a stationary member. The turbomachine includes: a first seal air flow path passing through at least a part of a section between the rotating body and the stationary member; a dry gas seal mounted to the first seal air flow path; and a narrow portion mounted to the first seal air flow path on a downstream side with respect to the dry gas seal. The turbomachine further includes a second seal air flow path connected to the first seal air flow path at place between the dry gas seal and the narrow portion.

CITATION LIST

Patent Literature

PTL 1: Japanese Patent Application Laid-Open No. 2010-159634

SUMMARY OF INVENTION

Technical Problem

The above-described PTL 1 discloses the turbomachine which uses the dry gas seal and which is adapted to inhibit droplet formation on the dry gas seal by providing the second seal air flow path.

However, the above-described PTL 1 does not refer to a centrifugal multistage compressor which is adapted to inhibit corrosion of a so-called intermediate stage labyrinth.

In this connection, the present invention provides the centrifugal multistage compressor which is adapted to inhibit the corrosion of the intermediate stage labyrinth. More particularly, the present invention provides a centrifugal multistage compressor adapted to inhibit carbon dioxide corrosion of the intermediate stage labyrinth.

Solution to Problem

According to an aspect of the present invention for achieving the above object, a centrifugal multistage compressor includes: a rotary shaft equipped with a plurality of impellers; an ejection flow path extended between a first stage of the impellers and a last stage of the impellers and serving to discharge a fluid once from the compressor; a suction flow path extended between the first stage of the impellers and the last stage of the impellers and serving to inject the discharged fluid once again into the compressor; an intermediate diaphragm disposed between the ejection flow path and the suction flow path; and an intermediate stage labyrinth for sealing between the ejection flow path and the suction flow path, and has a configuration wherein the intermediate diaphragm includes a bypass flow path for supplying the intermediate stage labyrinth with some of the fluid flowing to the ejection flow path.

Advantageous Effects of Invention

According to the present invention, the centrifugal multistage compressor adapted to inhibit the corrosion of the intermediate stage labyrinth is provided. More particularly, the present invention provides the centrifugal multistage compressor adapted to inhibit the carbon dioxide corrosion of the intermediate stage labyrinth.

The other objects than the above, features and advantages of the present invention will be apparent from the following description of the following working example of the present invention.

DESCRIPTION OF EMBODIMENTS

Figure 1:
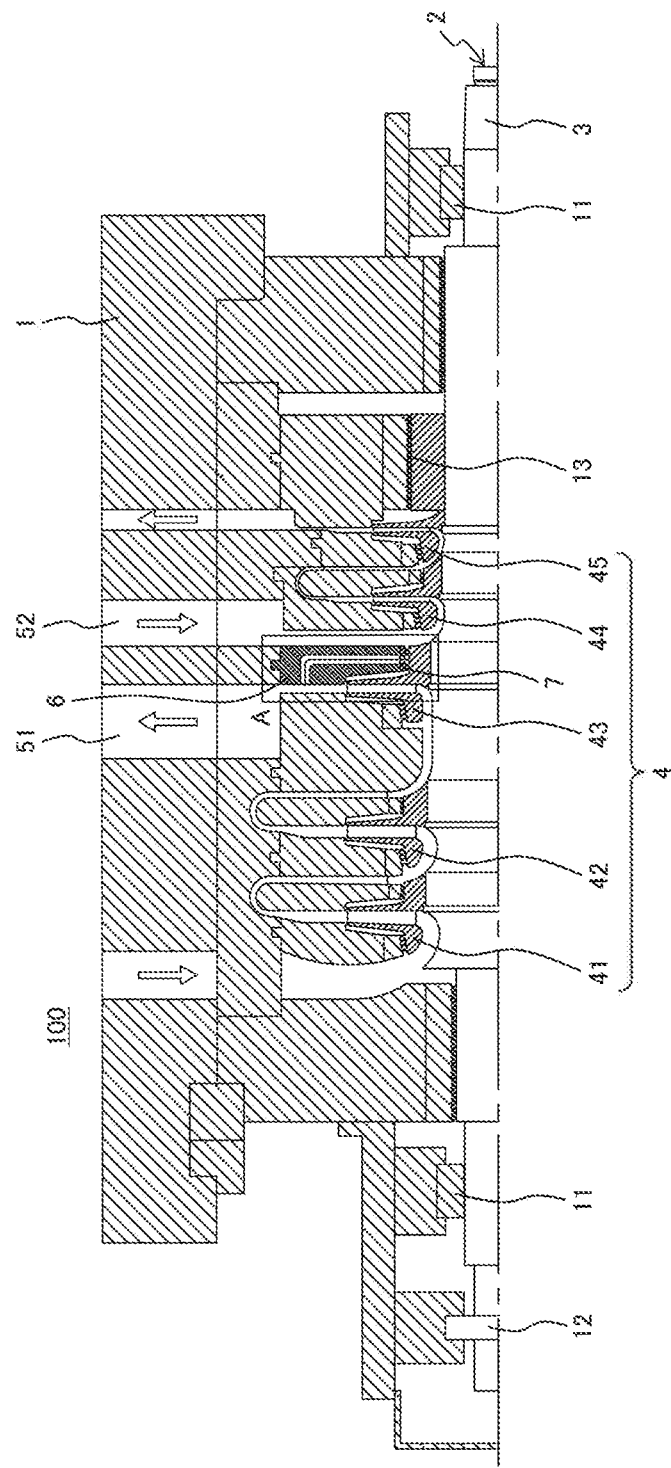
FIG. 1 is an illustrative diagram showing a centrifugal multistage compressor according to an example hereof.

The working examples of the present invention will hereinbelow be described with reference to the accompanying drawings. Throughout the Figures, equal or similar reference numerals are assigned to equal or similar components, while a description of a duplicate part may sometimes be dispensed with.

Example 1

FIG. 1 is an illustrative diagram showing a centrifugal multistage compressor according to an example hereof.

A centrifugal multistage compressor 100 according to the example (hereinafter, referred to as a compressor 100) includes: a rotary shaft 3 equipped with a plurality of (five impellers according to the example) impellers 4 (impeller 41, impeller 42, impeller 43, impeller 44, impeller 45); an ejection flow path 51 extended between a first stage impeller 41 and a last stage impeller 45 and serving to discharge a fluid (process fluid) once from the compressor; and a suction flow path 52 extended between the first stage impeller 41 and the last stage impeller 45 and serving to inject the discharged fluid (process fluid) once again into the compressor.

It is feared that in future, the compressor 100 will be faced with an increased flow volume of a fluid (process fluid) handled by the compressor 100. The compressor is even more strongly required to inhibit the corrosion or particularly the carbon dioxide corrosion.

The compressor 100 of the example uses $CO_2$ (hereinafter, the fluid will be referred to as $CO_2$). It is noted that $CO_2$ is often a wet gas containing water vapor. In addition, $CO_2$ is a relatively heavy gas. Hence, $CO_2$ is predisposed to temperature rise when pressurized (compressed).

Therefore, the compressor 100 of the example has the following pressurizing process for enhancing compression efficiency. Specifically, the compressor 100 discharges once the $CO_2$ pressurized and raised in temperature from between the first stage impeller 41 and the last stage impeller 45. The discharged $CO_2$ is cooled as it passes through a gas cooler (not shown). Furthermore, the discharged $CO_2$ cooled and lowered in temperature is injected once again into the compressor 100 via place between the first stage impeller 41 and the last stage impeller 45.

Incidentally, when the $CO_2$ cooled by the gas cooler (not shown) is injected once again into the compressor 100, the $CO_2$ is subjected to high pressure, low temperature conditions and has humidity of 100%.

A shaft seal equipment called an intermediate stage labyrinth 7 is disposed between an impeller of a stage (hereinafter referred to as an upstream Gr. last stage) (the impeller 43 in this example) just before the $CO_2$ is discharged once from the compressor 100 and an impeller of a stage (hereinafter referred to as an downstream Gr. first stage) (the impeller 44 in this example) right after the $CO_2$ is injected once again into the compressor 100.

Further, an intermediate diaphragm 6 is disposed between the ejection flow path 51 and a suction flow path 52.

Between the upstream Gr. last stage (impeller 43) and the downstream Gr. first stage (impeller 44), the intermediate stage labyrinth 7 is disposed for reducing a leakage flow rate of the process fluid ($CO_2$ in this example) flowing through a gap between the rotating body (impeller 43) and a stationary body (intermediate diaphragm 6) in the compressor 100.

Specifically, the intermediate stage labyrinth 7 is formed at the intermediate diaphragm 6, serving to seal between the ejection flow path 51 and the suction flow path 52.

The compressor 100 according to the example includes: a casing 1 as the stationary body defining an outer shell of the machine body; and a rotor 2 rotatably assembled in the casing 1. The rotor 2 includes the rotary shaft 3; and a plurality of (five stages according to the example) impellers 4 (41, 42, 43, 44, 45) which are mounted to the rotary shaft 3 so as to compress the $CO_2$ by rotation.

As pressurized by the impeller 41, impeller 42 and impeller 43 and raised in temperature, the $CO_2$ is discharged once from the compressor 100 via the ejection flow path 51 and cooled as flowing through the gas cooler (not shown). Subsequently, the $CO_2$ is injected once again into the compressor 100 via the suction flow path 52 and pressurized by the impeller 45.

The intermediate diaphragm 6 forming the flow path is disposed between the impeller 43 and the impeller 44. The intermediate stage labyrinth 7 is disposed at the intermediate diaphragm 6.

The intermediate stage labyrinth 7 is disposed for reducing the leakage flow rate of the fluid flowing through the gap produced between the impeller 43 as the rotating body and the intermediate diaphragm 6 as the stationary body.

Incidentally, the rotary shaft 3 is supported by a journal bearing 11 and a thrust bearing 12. The latter part of the impeller 45 is sealed with a balanced seal 13.

Figure 2:
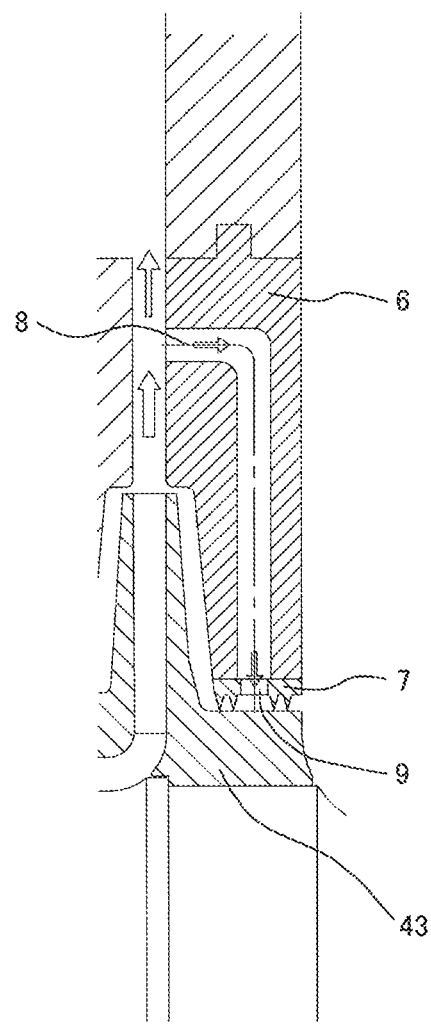
FIG. 2 is a fragmentary enlarged view showing an adjacent area of an intermediate diaphragm of the centrifugal multistage compressor according to the example hereof.

FIG. 2 is a fragmentary enlarged view showing an adjacent area of the intermediate diaphragm provided at the centrifugal multistage compressor according to the example hereof.

The intermediate diaphragm 6 (the inside of the intermediate diaphragm 6) is formed with a bypass flow path 8 which supplies the intermediate stage labyrinth 7 with some of the $CO_2$ flowing to the ejection flow path 51 (discharged from the impeller 43 and flowing to the ejection flow path 51.)

Specifically, the $CO_2$ pressurized by the impeller 43 is discharged from the impeller 43, while some of the $CO_2$ is oriented in a radial direction of the rotary shaft 3.

It is noted that the intermediate diaphragm 6 defines a flow path (diffuser vane) of the $CO_2$ discharged from the impeller 43. Namely, the intermediate diaphragm 6 separates the impeller 43 and the impeller 44.

The diaphragm 6 is formed with the bypass flow path 8 which extends therethrough to a fixed portion of the intermediate stage labyrinth 7. The bypass flow path is formed by drilling.

Through this bypass flow path 8, some of the $CO_2$, which is pressurized by the impeller 43, discharged from the impeller 43 and flows to the ejection flow path 51, is allowed to flow to the fixed portion of the intermediate stage labyrinth 7.

That is, the bypass flow path 8 for detouring the $CO_2$ is formed in the compressor 100 (in the intermediate diaphragm 6) so that a high-pressure, high-temperature $CO_2$ (hereinafter, referred to as "hot gas") before discharged from the upstream Gr. last stage (impeller 43) to the outside of the compressor 100 can be supplied to the intermediate stage labyrinth 7 interposed between the upstream Gr. last stage (impeller 43) and the downstream Gr. first stage (impeller 44).

Namely, the bypass flow path 8 is formed for suppling the hot gas to the intermediate stage labyrinth 7.

The bypass flow path 8 is formed in the intermediate diaphragm 6 for fixing the intermediate stage labyrinth 7 disposed between the upstream Gr. last stage (impeller 43) and the downstream Gr. first stage (impeller 44). An inlet of the bypass flow path is formed at the diffuser vane while an outlet thereof is formed at the fixed portion of the intermediate stage labyrinth.

The intermediate stage labyrinth 7 includes a through hole 9 permitting the passage of the $CO_2$ flowing through the bypass flow path 8. The through hole 9 connects the intermediate stage labyrinth 7 and the bypass flow path 8 in the radial direction of the rotary shaft 3.

There are a plurality of bypass flow paths 8 and the through holes 9 radially formed in the radial direction of the rotary shaft 3. Incidentally, the through holes may also be formed in a circumferential direction of the rotary shaft 3. It is also preferred that the through holes are formed at an intermediate portion of the intermediate stage labyrinth 7 with respect to an axial direction of the rotary shaft 3.

A phase of the bypass flow path 8 formed in the intermediate diaphragm 6 is matched with that of the through holes 9 formed in the intermediate stage labyrinth 7 with respect to the circumferential direction of the rotary shaft 3. By doing so, the hot gas discharged from the upstream Gr. last stage (impeller 43) is supplied to a gap between the intermediate stage labyrinth 7 and the rotating body (impeller 43) via the bypass flow path 8.

It is preferred that the number of the through holes 9 formed through the intermediate stage labyrinth 7 in the radial direction of the rotary shaft 3 is the same as the number of the bypass flow paths 8 formed in the intermediate diaphragm 6. It is preferred that the bypass flow paths 8 formed in the intermediate diaphragm 6 are in phase with the trough holes 9 formed in the intermediate stage labyrinth 7 with respect to the circumferential direction of the rotary shaft 3. This configuration is adapted to reduce resistance to the flow of the hot gas.

Some of the $CO_2$ flowing in the radial direction of the rotary shaft 3 as driven by the impeller 43 is guided into the gap between the intermediate stage labyrinth 7 and the rotating body (impeller 43) via the bypass flow paths 8 and the through holes 9.

Flowing into the gap between the intermediate stage labyrinth 7 and the rotating body (impeller 43), the hot gas flows toward the impeller 44 (see FIG. 1). The flow of the hot gas acts as a shaft seal, thus preventing the $CO_2$ having humidity of 100% from flowing from the impeller 44 into the impeller 43 through the intermediate stage labyrinth 7.

Namely, the configuration is adapted to inhibit liquid condensation caused by static temperature drop and resulting in carbon dioxide corrosion (phenomenon that moisture in the $CO_2$ is liquified while the $CO_2$ is dissolved in the resultant water to produce carbonic acid) as well as contact between the carbonic acid and metal.

It is preferred that two or more bypass flow paths 8 are formed in the circumferential direction of the rotary shaft 3. This is for uniformly supplying the hot gas in the circumferential direction of the rotary shaft 3. The number of the bypass flow paths 8 is decided according to the specifications of the compressor 100.

According to the example, the high-pressure, high-temperature hot gas containing little moisture is supplied to the gap between the intermediate stage labyrinth 7 and the rotating body (impeller 43). The supplied hot gas flows from the upstream Gr. last stage (impeller 43) and passes through the gap between the intermediate stage labyrinth 7 and the rotating body (impeller 43). Thus, the hot gas is supplied to the downstream Gr. first stage (impeller 44).

The supply of this hot gas prevents the $CO_2$ having humidity of 100%, which was discharged once from the compressor 100, cooled and injected once again into the compressor, from passing through the intermediate stage labyrinth 7 and flowing into the upstream Gr. last stage (impeller 43).

In the intermediate stage labyrinth 7, when the $CO_2$ (process fluid) flows from the downstream Gr. first stage (impeller 44) into the upstream Gr. last stage (impeller 43), the static temperature of the $CO_2$ drops due to the increased flow velocity thereof during the passage through the gap.

This $CO_2$ has the humidity of 100%. In conjunction with the static temperature drop, the moisture in the $CO_2$ is liquified so that the $CO_2$ is dissolved in the resultant water, producing carbonic acid. The contact between carbonic acid and the metal may result in carbon dioxide corrosion which causes damage to the intermediate stage labyrinth 7.

In the event of the carbon dioxide corrosion of the intermediate stage labyrinth 7, the gap between the rotating body (impeller 43) and the stationary body (intermediate diaphragm 6) expands, resulting in the increase in the leakage flow rate. With the increased leakage flow rate, the flow volume of the fluid circulating in the compressor 100 will increase. This may result in the performance degradation (efficiency degradation) of the compressor 100.

In a case where the carbon dioxide corrosion continues, the corrosion may cause damage to the impeller 43 (the downstream Gr. first stage). This may lead to fear of excessive vibrations of the compressor 100.

The compressor 100 according to the example is adapted to inhibit the carbon dioxide corrosion of the intermediate stage labyrinth 7, limit the damage to the intermediate stage labyrinth 7, and inhibit the performance degradation (efficiency degradation) of the compressor 100. Furthermore, the compressor of the example can limit the damage to the impeller 43 (the downstream Gr. first stage) and prevent the excessive vibrations of the compressor 100.

It is contemplated to form the intermediate stage labyrinth by use of a material having resistance to the carbon dioxide corrosion so as to inhibit the carbon dioxide corrosion of the intermediate stage labyrinth 7. That is, the use of the intermediate stage labyrinth made from stainless steel having corrosion resistance is contemplated.

According to the example, on the other hand, the carbon dioxide corrosion of the intermediate stage labyrinth 7 is prevented by inhibiting the liquid condensation associated with the static temperature drop that may induce the carbon dioxide corrosion. According to the example, an intermediate stage labyrinth made of relatively soft aluminum (including an aluminum alloy) is usable as the intermediate stage labyrinth 7.

According to the example, the intermediate stage labyrinth 7 uses a contactless aluminum labyrinth fin which is out of contact with a structural object of the rotating body 3. Specifically, the compressor 100 according to the example has a configuration where the structural object of the rotating body 3 is out of contact with a tip of the labyrinth fin of the intermediate stage labyrinth 7.

However, if the structural object of the rotating body 3 and the tip of the aluminum labyrinth fin (the intermediate stage labyrinth 7 made of aluminum) should be in contact with each other during the operation of the compressor 100, the use of the aluminum labyrinth fin (intermediate stage labyrinth 7 made of aluminum) would obviate the damage to the structural object of the rotating body 3. Rather, the intermediate stage labyrinth (labyrinth fin) 7 would be more likely to sustain damage.

Incidentally, the replacement of the intermediate stage labyrinth 7 is easier than the replacement of the structural object of the rotating body 3. Therefore, the compressor 100 according to the example is also improved in maintainability by using the aluminum intermediate labyrinth (labyrinth fin) 7.

In a case where the stainless-steel intermediate stage labyrinth is used, on the other hand, it is feared that the above-described contact may cause damage to the structural object of the rotating body 3. Therefore, it is indispensable to prevent such a contact reliably in the case of use of the stainless-steel intermediate stage labyrinth. Hence, the gap between the stainless-steel intermediate stage labyrinth and the structural object of the rotating body 3 needs to be made larger than the gap between the aluminum intermediate stage labyrinth and the structural object of the rotating body.

If such a gap is made larger, the leakage flow rate in the intermediate stage labyrinth increases. This may lead to the performance degradation of the compressor 100.

The intermediate stage labyrinth (labyrinth fin) 7 according to the example is made of aluminum. This negates the need for increasing the size of such a gap more than necessary. Hence, the performance degradation (efficiency degradation) of the compressor 100 can be prevented. Further, the carbon dioxide corrosion of the intermediate stage labyrinth 7 can be inhibited by forming the bypass flow path 8 in the intermediate diaphragm 6 and forming the through holes 9 in the intermediate stage labyrinth 7. Thus, the performance degradation (efficiency degradation) of the compressor 100 is prevented.

The compressor 100 according to the example is adapted to inhibit the liquid condensation caused by the static temperature drop, the liquid condensation resulting in the carbon dioxide corrosion. The compressor is adapted to inhibit the contact between the carbon dioxide and metal. Hence, the compressor of the example permits the use of aluminum as the material of the intermediate stage labyrinth 7.

It is noted that the present invention is not limited to the above-described example but may include a variety of modifications.

REFERENCE SIGNS LIST

1 . . . casing
2 . . . rotor

3 . . . rotary shaft
4 . . . impeller
51 . . . ejection flow path
52 . . . suction flow path
6 . . . intermediate diaphragm
7 . . . intermediate stage labyrinth
8 . . . bypass flow path
9 . . . through hole

The invention claimed is:

1. A centrifugal multistage compressor comprising:
a rotary shaft equipped with a plurality of impellers;
an ejection flow path extended between a first stage of the impellers and a last stage of the impellers and serving to discharge a fluid once from the compressor;
a suction flow path extended between the first stage of the impellers and the last stage of the impellers and serving to inject the discharged fluid once again into the compressor;
an intermediate diaphragm disposed between the ejection flow path and the suction flow path; and
an intermediate stage labyrinth for sealing between the ejection flow path and the suction flow path,
wherein the intermediate diaphragm includes a bypass flow path for supplying the intermediate stage labyrinth with some of the fluid flowing to the ejection flow path.

2. The centrifugal multistage compressor according to claim 1,
wherein the intermediate stage labyrinth is disposed at the intermediate diaphragm.

3. The centrifugal multistage compressor according to claim 2,
wherein the intermediate stage labyrinth includes a through hole allowing the passage of the fluid flowing through the bypass flow path.

4. The centrifugal multistage compressor according to claim 1,
wherein the fluid is $CO_2$.

5. The centrifugal multistage compressor according to claim 1,
wherein the intermediate stage labyrinth is made of aluminum.

* * * * *